United States Patent
Pohlmann et al.

(12)

(10) Patent No.: US 6,748,454 B1
(45) Date of Patent: Jun. 8, 2004

(54) METHOD AND APPARATUS FOR A USER EXTENSIBLE EVENT STRUCTURE

(75) Inventors: William N. Pohlmann, Newton Square, PA (US); Kenneth D. Matson, Bellevue, WA (US); David Asbell, Blue Bell, PA (US)

(73) Assignee: Computer Associates Think, Inc., Islandia, NY (US)

( * ) Notice: Subject to any disclaimer, the term of this patent is extended or adjusted under 35 U.S.C. 154(b) by 0 days.

(21) Appl. No.: 09/224,808

(22) Filed: Jun. 18, 2001

(Under 37 CFR 1.47)

(51) Int. Cl.[7] .................................................. G06F 9/54
(52) U.S. Cl. ........................................................ 709/318
(58) Field of Search ................................ 709/310–320; 705/26

(56) References Cited

U.S. PATENT DOCUMENTS

| | | | |
|---|---|---|---|
| 5,237,684 A | 8/1993 | Record et al. ............... 709/318 |
| 5,305,454 A * | 4/1994 | Record et al. ............... 709/318 |
| 5,530,868 A * | 6/1996 | Record et al. ............... 709/318 |
| 6,141,006 A * | 10/2000 | Knowlton et al. ............ 705/26 |

* cited by examiner

*Primary Examiner*—St. John Courtenay, III
(74) *Attorney, Agent, or Firm*—Baker & McKenzie

(57) ABSTRACT

A method for extending an event structure including submitting a keyname and a corresponding value for the event structure and determining whether the keyname exists in a keys field array of the event structure. If the keyname does not exist in the keys field array, the method includes incrementing an index of the event structure, adding the keyname to a position in the keys field array based on the index and adding the corresponding value to a position in the values field array based on the index. If the keyname does exist in the keys field array, the method includes determining the position of a previously stored value in the values field array associated with the keyname and replacing the previously stored value in the values field array with the corresponding value.

9 Claims, 5 Drawing Sheets

METHOD AND APPARATUS FOR A USER EXTENSIBLE EVENT STRUCTURE

FIELD OF THE INVENTION

The present invention relates to the field of event management systems, in particular to a user extensible event structure of an event management system.

BACKGROUND INFORMATION

Information technology (IT) has evolved from mainframe-only computing to complex, highly distributed computer systems spanning across desktops and departments through networks. These distributed computing environments provide benefits, including the flexibility to select any number of platforms, domains, tools, and network configurations. The distributed environments, however, may be complex. Further, there may exist a lack of compatibility and integration between software tools and platforms. For example, conventional point products (e.g., the Platinum DBVision product manufactured by Platinum technology, inc. of Oak Brook, Ill.) are generally directed to a specific function or area of expertise such as a solution for database monitoring and management, job scheduling, or managing database reorganizations. Each point product provides a specific capability and each also includes a distinct interface. On the other hand, utilizing framework technology provides an integrated solution, although tool functionality is significantly sacrificed. Further, maintaining the current enterprise environment utilizing either conventional point products or framework technology involves a large amount of resources and money from IT organizations.

Accordingly, a need exists for an integrated system for providing tools that utilize a compatible interface with an event structure that may be uniquely defined as may be required by the tools.

SUMMARY OF THE INVENTION

An object of the present invention is providing an integrated system for monitoring events occurring in point products through a common event management system including a user extensible event structure.

An aspect of the present invention provides a method for extending an event structure including submitting a keyname and a corresponding value for the event structure and determining whether the keyname exists in a keys field array of the event structure. If the keyname does not exist in the keys field array, the method includes incrementing an index of the event structure, adding the keyname to a position in the keys field array based on the index and adding the corresponding value to a position in the values field array based on the index. If the keyname does exist in the keys field array, the method includes determining the position of a previously stored value in the values field array associated with the keyname and replacing the previously stored value in the values field array with the corresponding value.

DETAILED DESCRIPTION

Figure 1:
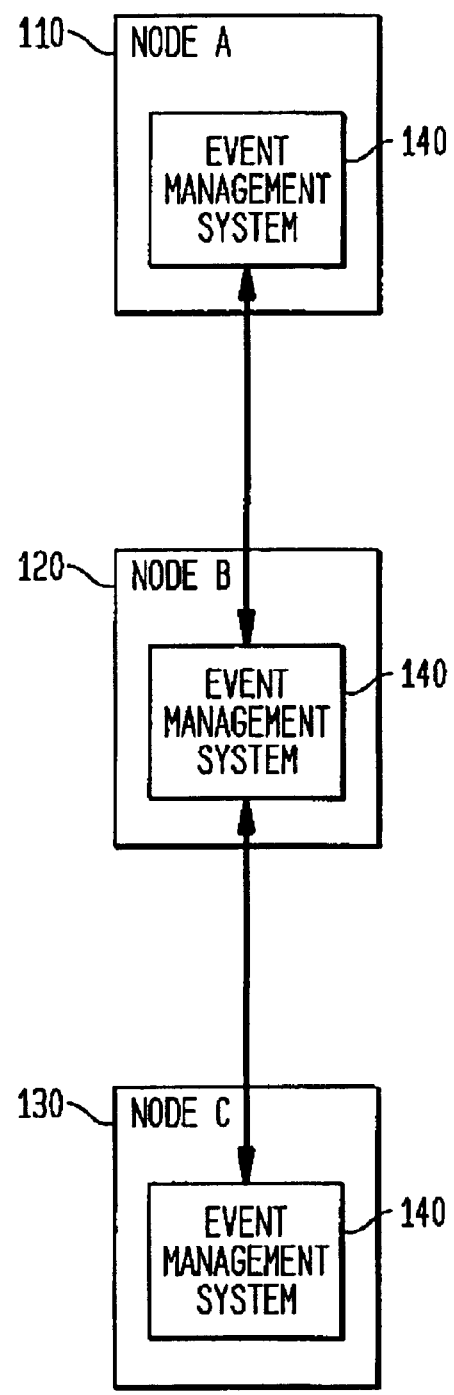
FIG. 1 shows an exemplary embodiment of an enterprise of the present invention including a plurality of nodes.

The event management system of the present invention manages an enterprise (e.g., a computer network such as a local area network (LAN) or wide area network (WAN)), correlates event information occurring in the enterprise, and takes corrective actions based on predetermined response policies. The event management system receives, for example, event messages from compatible point products within the enterprise. As shown in FIG. 1, the enterprise 100 may include a plurality of nodes 110, 120, 130 which may, for example, be connected by a network (not shown). A node is, for example, a physical box such as a personal computer, server, etc. that runs an operating system. In an exemplary embodiment of the present invention, a node may be a personal computer having a compatible point product installed on it. In an exemplary embodiment of the present invention, the event management system 140 manages events on the nodes 110, 120, 130 where the events are generated, minimizing the movement of data on the network and keeping actions such as evaluation, reporting and automated correction of data close to the source.

Figure 2:
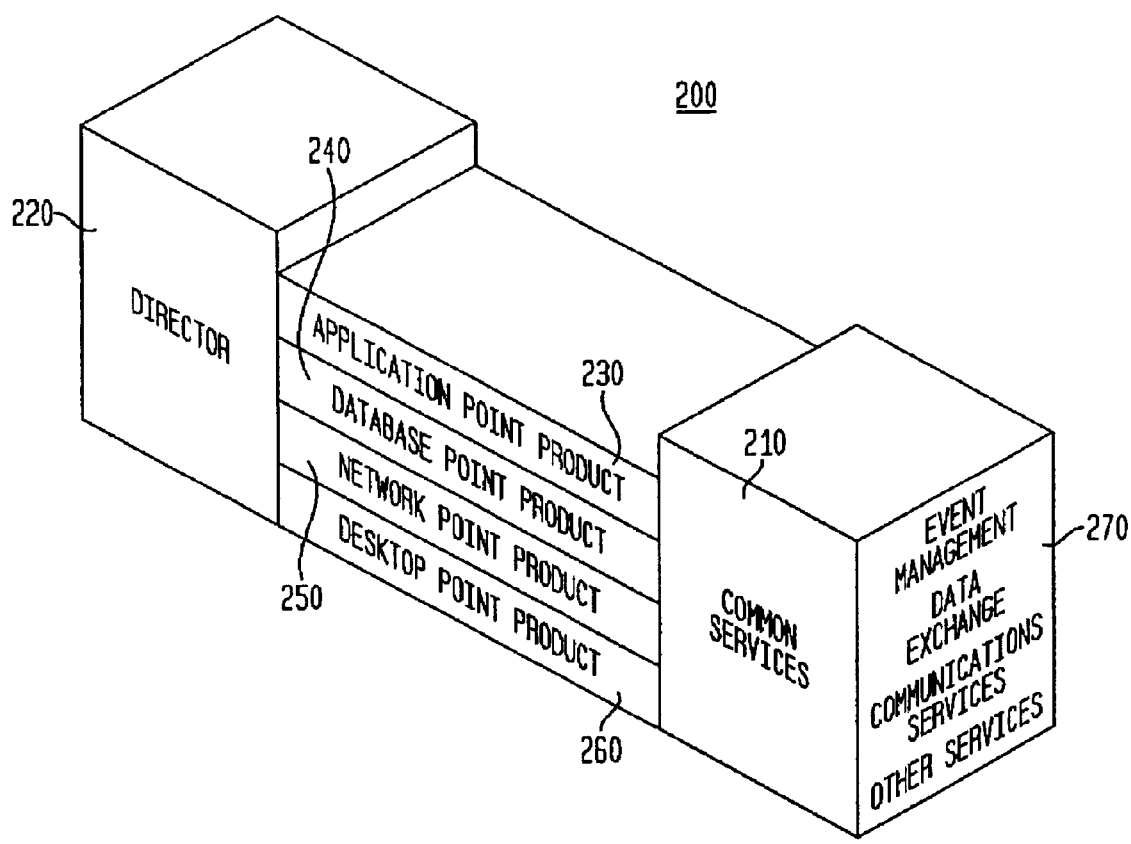
FIG. 2 shows an exemplary embodiment of a suite of integrated point products of the present invention.

In an exemplary embodiment of the present invention as shown in FIG. 2, the event management system 270 may be included in a suite 200 of integrated tools including compatible point products used to, for example, manage applications, databases, desktops, networks, and systems. The tools 230, 240, 250, 260 may use a set of common services 210 to share data relating to events. A director 220 is, for example, a shared, common graphical user interface (GUI) running in a conventional server computer for compatible point products 230, 240, 250, 260. In an exemplary embodiment of the present invention, the director 220 runs under Windows NT and Windows 95, and operates as a single console that allows users to view and interact with all resources including compatible point products 230, 240, 250, 260 in the enterprise.

The primary manageable unit of information utilized by the event management system of the present invention is a structured message called an event. An event represents information about some significant occurrence by or to a resource in the enterprise. Events are sent and received by compatible point products and event managers in the event management system. Events are, for example, the basic building blocks of real-time information processing used to manage the enterprise. Events define the fundamental element of publishable, sharable information and the format in which the events should be maintained and transmitted. The structure of an event includes, for example, predefined fields for the fundamental information necessary for any event record. The predetermined fields fall into two categories: identifying fields; and non-identifying fields. Identifying fields are fields that taken together form a unique key for the event, distinguishing it from another event. Non-identifying fields are fields that add additional information about an event but do not participate in the key of the event. The event management system of the present invention allows the event structure to be extended by a user by dynamically adding key value pairs and thus, uniquely defining the respective event structure. Accordingly, the addition of key value pairs to an event structure enables a point product to publish the uniquely-defined event that otherwise would not have been published because it would not have been uniquely defined by the predetermined fields of the event.

An exemplary event structure according to an embodiment of the present invention is defined below, for example, in the C language.

prise that cannot be changed without changing the occurrence that causes the event. An alarm is, for example, an interpretation of other events based on a user configurable policy. Accordingly, the user could clear an alarm at anytime without resolving the condition that caused it. Similarly, the alarm can persist beyond the clearing of an event upon which the alarm is based.

```
typedef struct_PT_EVENT
{
int             Version;        /* Event structure version                              */
PT_CHAR_T       *Node;          /* Node of event                                         */
PT_CHAR_T       *Class;         /* Event class                                           */
PT_CHAR_T       *Instance;      /* Originating product instance                          */
PT_CHAR_T       *Name;          /* Event name                                            */
PT_CHAR_T       *Time;          /* Event time (yyyymmdd hh24miss)                        */
PT_CHAR_T       *CondTime;      /* Condition time (yyyymmdd hh24miss)                    */
PT_CHAR_T       *AgentNode;     /* Node where detecting agent is running                 */
PT_CHAR_T       *EvmgrNode;     /* Node where responsible event mgr runs                 */
PT_EVENT_TYPE   Type;           /* Event type (EV_DISCRETE...)                           */
PT_RESP_TYPE    Response;       /* Response type (EVRE_SILENCE...)                       */
PT_CHAR_T       *RespPolicy;    /* Response Policy                                       */
PT_CHAR_T       *Descr;         /* Description                                           */
PT_CHAR_T       *DescrId;       /* Message string key for MsgPut                         */
PT_CHAR_T       *DescrFields;   /* Field list for substitution in message                */
double          Value;          /* Value (for condition/alarm events)                    */
int             Level;          /* Alarm level (for type= EV_ALARM_SET)                  */
PT_CHAR_T       *IntKeys;       /* Application specific internal keys                    */
int             NumKey;         /* Number of key/value pairs following                   */
PT_CHAR_T       **Keys;         /* Array of other key (attribute) names                  */
PT_CHAR_T       **Values;       /* Array of other key(attribute) values                  */
BOOL            Archived;       /* Boolean flag, TRUE if event archived                  */
PT_CHAR_T       *Id;            /* Unique event id                                       */
PT_CHAR_T       *CondId;        /* Condition id                                          */
int             RepeatCount;    /* Count of duplicate events of this
                                   type used for storm suppression                       */
int             HopCount;       /* Here comes Peter Cotton Tail...                       */
PT_CHAR_T       *GMTOffset;     /* GMT Offset                                            */
int             ActionTaken;    /* Boolean flag, Response action in progress             */
BOOL            Silenced;       /* Boolean flag, Alarm silenced                          */
PT_CHAR_T       *ProductName;   /* Product name of submitting product                    */
PT_CHAR_T       *InstanceType;  /* Type of instance in Instance                          */
void            *localParam;    /* Hook to allow local associated data with event        */
PT_CHAR_T       *AuthString;    /* Placeholder for authorization string, some form of event
                                   content signature                                     */
PT_CHAR_T       *TTId;          /* Trouble ticket id                                     */
PT_CHAR_T       *TTStatus;      /* Trouble ticket status                                 */
}_PT-EVENT;
```

The identifying fields of the exemplary event are node, name, product, instance, type, condition_time if the type is not discrete, event time if the type is discrete, all key value pairs including the contents of the keys field array and values field array (with the field, for example NumKeys, including a number indicating the number of key value pairs in their respective field arrays). All of the other predefined fields are non-identifying fields.

Figure 3:
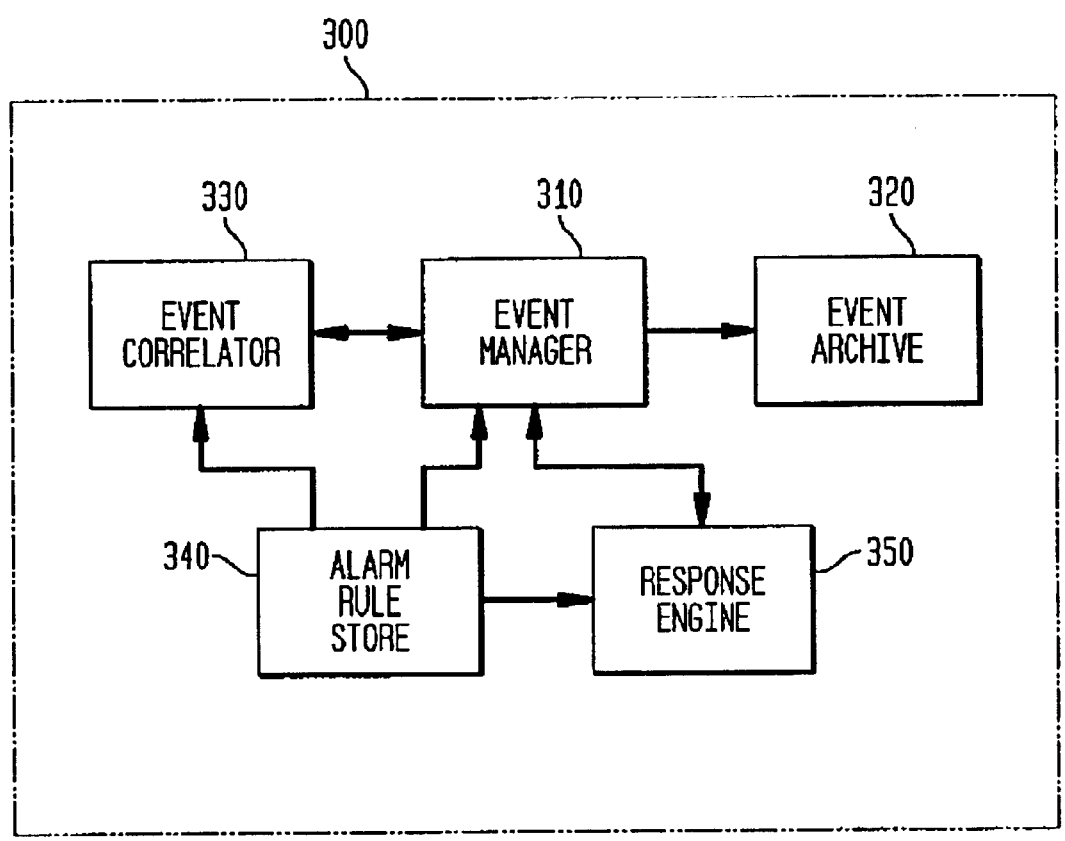
FIG. 3 shows an exemplary embodiment of a block diagram of an event management system of the present invention.

The events may be categorized into a plurality of types including, for example, discrete events, conditions and alarms. Discrete events are events which indicate that something occurred at a particular time and are completely self-contained. The occurrence for a discrete event has no state and does not get updated. A failed logon attempt, for example, may invoke the generation of a discrete event. Conditions are events that indicate the state of something that is persistent over a period of time and may have attributes that are updated. The events declared by a product are owned by that product. Generally, only the respective point product can update or clear the condition events generated at the point product. The contents of discrete and condition events represent real information about the enter- As shown in FIG. 3, an exemplary embodiment of an event management system 300 of the present invention includes an event manager 310, event archive 320, event correlator 330, alarm rule store 340, and a response engine 350. In an exemplary embodiment of the present invention, an event manager 310, event archive 320, event correlator 330, and a response engine 350 are included on all nodes of the enterprise and the alarm rule store 340 is included on one central store, allowing events to be stored and managed locally.

In an exemplary embodiment of the present invention, an event management system may, for example, receive event messages from point products, for example, throughout an enterprise. Events are managed on a node of the enterprise where the events are received by an event manager 310 located on the respective node. The event manager 310 may, for example, receive all events, maintain the states of previously sent events, maintain a list of subscriptions, and route events to the appropriate subscribers. In an exemplary embodiment of the present invention, the events and their state and the list of subscriptions may be stored locally.

Figure 4:
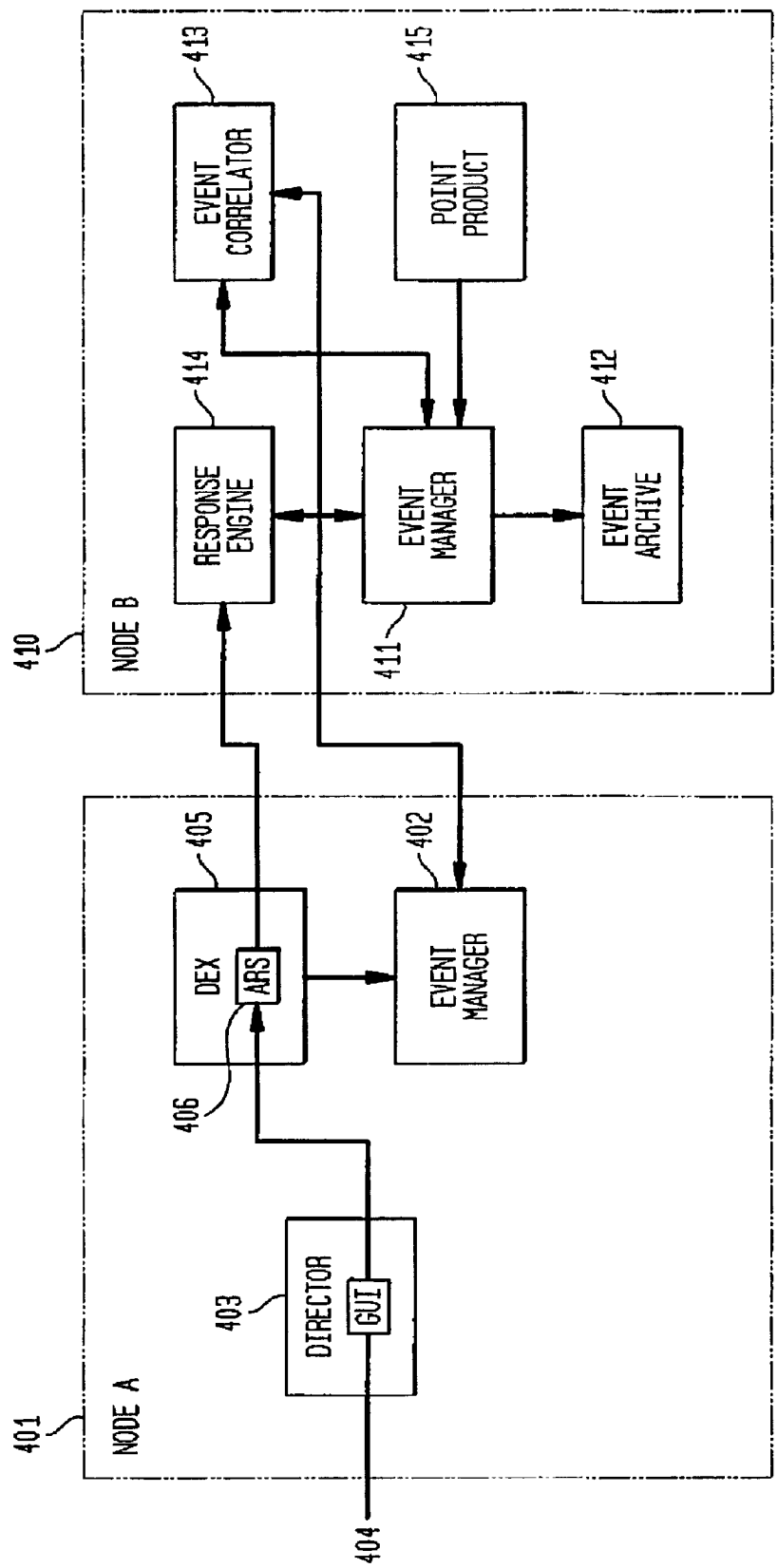
FIG. 4 shows an exemplary embodiment of event information communicated between a plurality of nodes of the event management system of the present invention.

As shown in FIG. 4, the event manager 402 of node a 401 and the event manager 411 of node b 410 also receive event information from the event correlator 413 of node b 410. The event manager 411 of node b 410 also provides events to the event correlator 413 on node b 410. The event manager 411 also receives event information from point product 415, where events are actually occurring. Event managers 402, 411 maintains for example, the events and their associated state and a list of subscriptions. Each event manager may have a local memory data store, e.g., a blackboard, where statefull events are stored. The blackboard may be kept persistent in a file based storage, for recovery of the information across generations (process invocation of the event manager). The clients subscribing to events are responsible for reestablishing the respective subscriptions across new invocations of the event manager. Accordingly, the subscriptions may be maintained in memory. The local event archive may also be maintained for all the events received by the event manager. The event management system of the present invention may also correlate events from multiple nodes. In an exemplary embodiment of the present invention, the event management system provides views of events consolidated to single management stations or in views/categories that cross node boundaries.

The event management system of the present invention is structured to query or express interest in groups of events by criteria other than node through event subscription. Event subscription allows the specification of criteria on the contents of the fields of the event. Determining the events of interest to a particular process can be analogized, for example, to writing a database query that requests records matching criteria on various fields of the record. The request of the present invention differs from a normal data base query in that it is not solely a request for data already in existence, but an ongoing request for a collection of events that have yet to occur or exist.

When a subscription is made for an event such as, for example, an event occurring at a point product 415, a subscription request is sent to event manager 411 on node b 410. The event manager 411 receives the request and adds this request to its list of outstanding requests which may be stored, for example, in memory. The event manager 411 checks outstanding events previously stored, for example, in the respective blackboard, to see if it matches the request criteria. Each matching event is forwarded, e.g., published, to the requester, e.g., the subscriber of the event. Any new events which are received and match the subscription criteria are also forwarded. This may continue until the subscription is canceled.

In an exemplary embodiment of the present invention, a subscription is assigned a unique ID when it is formed. The unique ID and a datagroup from which this request came, uniquely defines the subscription. A subscription is canceled, for example, by calling an API with a returned request handle from the original subscription. This results in sending a cancel message to the event manager with the respective request ID. The event manager can then match the cancel request to the original subscription and remove it from a processing queue of the event manager.

All events published on a node are received by the event manager of the node. The event manager also receives and maintains all requests sent by processes from its node and other nodes. Upon receipt of an event, the event manager also assigns an event ID. The event manager determines if the event is a condition and if so, the event manager checks, for example, a blackboard to determine if the event matches an existing condition. If so, the condition event is assigned a condition ID of the existing condition. Further, if archiving is enabled, the event is archived. In an exemplary embodiment of the present invention, for example, the archiving may include storing the event in a database such as a flat file archive. A separate file may be used for each calendar day. Events may be written to the archive for the day of the time stamp in the event as newline delimited records in the order in which they are received.

The event manager also checks all outstanding subscription requests. For any event other than a condition update, if the received event matches the request, the event manager forwards the event to the requester. In the case of an update to a condition, it is the event as updated that is matched against the request. Accordingly, it is the updated event that the event manager forwards to the requester. Event subscription of the present invention includes an event filter which is described in detail in Platinum Provision Common Services Reference Guide, version 1.08 (October 1998, Platinum technology inc.) which is herein incorporated by reference in its entirety.

Event filters, which are described in copending patent application Ser. No. 09/224,482, filed on Dec. 31, 1998 and entitled METHOD AND APPARATUS FOR DYNAMIC EVENT FILTERING AND ROUTING which is herein incorporated by reference in its entirety, describe identifying criteria for the events of interest and allow specification of various forms of comparison that can be specified for each of the fields of an event including key value pairs of the extended event structure. An event filter is, for example, a Boolean expression made up of subexpressions that compare a field of an event with a user specified value. Event filters are, for example, similar to the "WHERE" clause in Structured Query Language (SQL). The fundamental subexpression of an event filter is, for example, a phrase comparing a field of an event with a value, e.g., node=ptisun20. The subexpression node=ptisun20 means that the node field of the event must exactly match the string "ptisun20". Any of the fields of the event structure can be used as the node field is used in the example, with the exception of the keys field array and values field array which require a special syntax. For example, if one of the key value pairs added was:

| key | value |
|---|---|
| FileSystem | /usr, | an exact match filter for this key value pair would be keyfield.FileSystem="/usr". Further, testing for the existence of a key with any value could be done by testing that it not match a null value, e.g., keyfield.FileSystem !=" ". The event filters may be stored any place a text string could be stored, for example, in a configuration file such as a flat text file, in a database, in memory, C source code (e.g., hard coded in a program), etc.

Filtering is also available on the values of key value pairs of the event. As in the earlier example, there may be a key "FileSystem" with an associated value that is the name of a specific file system. The desired events may only be those for a certain file system, for instance /usr. The filter mechanism for corresponding values of a key specifies the key and tests the associated value. A special syntax is used to distinguish keys from other fields of the event that allows a different name space for the keys from the predefined fields of the event. The syntax is "keyfield.[name]". An example testing for the value /usr of a key value pair would be, for example, keyfield.FileSystem=/usr.

In an exemplary embodiment of the present invention, the event filter may include comparison operators such as= and full regular expression match specified with the operator "like". A filter, for example, could be node=ptisun05. A filter matching all node values that follow a pattern of ptisun[#] would be node like "ptisun[0–9]+". The following is an exemplary list of event filter comparison operators: >=(greater than or equal), <=(less than or equal), >(greater than), <(less than), =(equal), like (matches a regular expression), likeci (case insensitive string match), and !=(not equal).

In an exemplary embodiment of the present invention, the following tokens, production rules, and event filter definition implemented using yet another compiler compiler (yacc) may be used.

%token NO_MORE_TOKENS
%token FILTER
%token <symp> NAME
%token <symp> FUNC_PART
%token <keywp> BOOLEAN
%token <keywp> COMPOP
%token <keywp> SEPARATOR
%token <keywp> LEFTPAREN
%token <keywp> RIGHTPAREN
%left BOOLEAN
%type <evalp> filter
%type <evalp> statement
%%

| statement: | FILTER filter NO_MORE_TOKENS |
|---|---|
| filter: | NAME COMPOP NAME |
| | \| FUNC_PART SEPARATOR NAME COMPOP NAME |
| | \| NAME COMPOP FUNC_PART SEPARATOR NAME |
| | \| filter BOOLEAN filter |
| | \| LEFTPAREN filter RIGHTPAREN |

In an exemplary embodiment of the present invention, the event manager 411 may be implemented as a daemon (e.g., an agent program that continuously operates on a UNIX server and provides resources to client systems on the network). Upon receiving an event, the event manager 411 determines the disposition of the event, including whether it has already received the event and whether the event state has changed. The event manager 411 also writes the event to a local event archive 412 and routes the event to all clients that subscribe to the event content. For example, the event manager 411 may provide event information to the event correlator 413 on a node 402. The event archive 412 may include an event archive service processor. The event archive 412 service processor reads events from the event archive. Subscribers may include any event correlator 413 instance that has an alarm rule subscribing to the event and, for example, a director containing a resource object or products subscribing to update events about the contents in a central storage such as a data exchange service (DEX).

The event correlator 413, which is described in copending patent application Ser. No. 09/224,487, filed on Dec. 31, 1998 and entitled SYSTEM AND METHOD FOR DYNAMIC CORRELATION OF EVENTS which is herein incorporated by reference in its entirety, may include, for example, an event correlator service processor. The event correlator 413 implements the user-policy specified in an alarm rule. An alarm is a type of event that provides notification to subscribers of a significant condition or occurrence. The determination of an alarm may include the presence of a single event, the presence of a certain existing state(s) when another event occurs, or the recurrence of a particular event within a fixed time window. Further, an alarm may be a combination of the recurrence of a particular event within a fixed time window when certain state or states are present.

The events that determine if an alarm occurs may be due to events on the same node as the event correlator 413 or may come from one or more other nodes 401, 410. An alarm may also be associated with an automated response policy on declaration allowing a response engine 414 to handle any automated notification or correction of the alarm. The event correlator 413 can create, for example, an alarm, a modified version of a received event, or an entirely new event that can be correlated by another alarm rule.

Events may be correlated through an alarm rule. The basis of an alarm rule is the determination of the events that should be analyzed. Alarm rules can be created to define which single event or set of events represent a significant occurrence to which to respond. The alarm rule may include a description and logic describing the events that represent an occurrence and a definition of the response of the event management system to the occurrence. The result of correlation is the creation of one or more events. An alarm rule may be defined, for example, through the director 404.

The response engine 414 executes a response policy. The response engine 414 includes a plurality of processes. The response policy is, for example, a logical expression containing a list of actions connected by logic statements that is invoked by a triggering alarm generated by the event correlator 413. Multiple actions can be defined and be performed in the response policy. In an exemplary embodiment of the present invention, the multiple actions may be in a listed sequence, or added with logic to make each action contingent upon the receipt of a return code of another action or a specified field sent in the alarm. The response policy may be created by defining a set of actions and composing an expression that references one or more of these actions in a logical sequence. The actions may be global and called by multiple response policies. In an exemplary embodiment of the present invention, the response engine 414 also adds information about the success of each action to the triggering alarm at the completion of each step. This may be accomplished, for example, by sending an update alarm event that updates the event with the sequential number of the step just completed, the type of the step (e.g., email/page), and in the event archive the name of the action step. This information may be accessed through a director.

In an exemplary embodiment of the present invention, the response engine 414 may include, for example, a first process, a second process, and a third process. The first process subscribes to events sent by an event correlator 413 running on the same node 410 as the response engine 414. Upon receipt of an alarm that has an associated response policy, the first process invokes the second process to perform the policy. The first process can invoke multiple instances of the second process depending upon the settings in configuration files associated with the respective processes. The second process performs an action requiring the sending of events and calls the third process to perform any other actions. The third process of the response engine 414 may also perform a response policy action requiring a call to the operating system, such as sending an email message, invoking a script, sending a page, writing a message to a file, or forwarding the event as a simple network management protocol (SNMP) trap.

Figure 5:
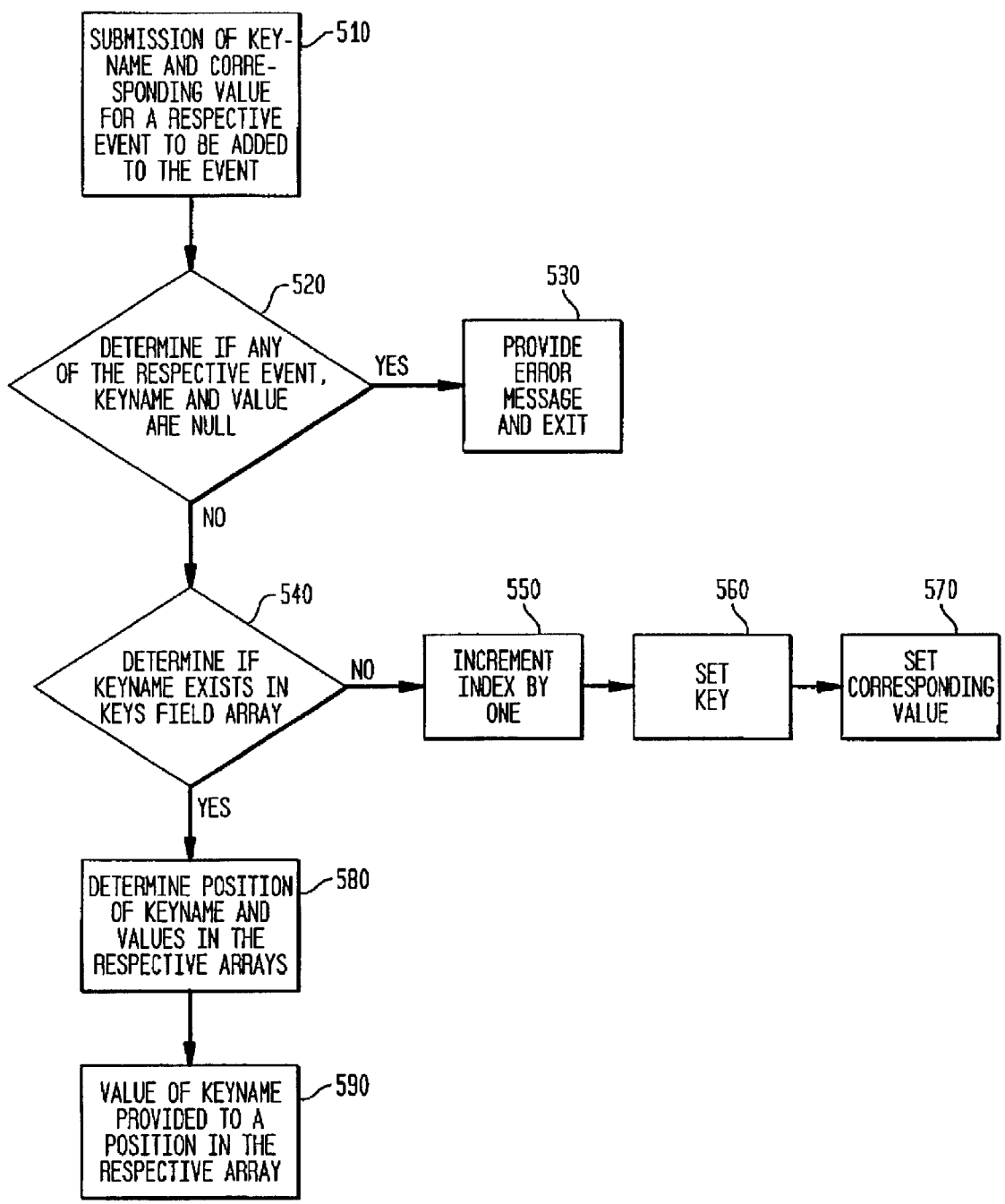
FIG. 5 shows an exemplary embodiment of a flow diagram of a process of extending an event structure of the present invention.

In an exemplary embodiment of the present invention, the event structure includes a keys field and a values field, each having extendable character arrays. The event structure may also include a field, for example, NumKeys, that includes the number of key value pairs contained in their respective field arrays. FIG. 5, shows an exemplary embodiment of a flow diagram of adding key value pairs to an event structure of the present invention. In step 510, a user submits, for example, through a point product, an event keyname and a corresponding value for a respective event structure to be added to the event structure. In an exemplary embodiment of the present invention, extending the event structure through the addition of key value pairs may be implemented, for example through a function call such as int PtEventSetKeyValuePair(PT_EVENT PtEvent, PT_CHAR_T*KeyName, PT_CHAR_T*Value). In step 520, if any of the event, the keyname and the value are null, an event application program interface (API) of the event management system of the present invention will provide an error message and exit the process of adding a key value pair to the event structure, as shown in step 530. Otherwise, in step 540 the event API will determine if the keyname already exists in the keys field array.

In an exemplary embodiment of the present invention, the event API determines whether a keyname exists by checking the input keyname with other keynames already stored in the keys field array, for example, through a function such as int PtEventFindKeyByIndex(PT_EVENT PtEvent, PT_CHAR_T*KeyName, int*index). In step 580, if the keyname is found in the keys field array, an index indicating the position in the array of the keyname is determined and may be provided to, for example, a calling function in an index variable. A return code may be provided to, for example, a calling function if the keyname is found, for example, PT_SUCCESS, and if the keyname is not found, for example, PT_FAIL. Further, in an exemplary embodiment of the present invention the keys field array and values field array are the same size and the key and corresponding value will have the same index in their respective arrays. Accordingly, if the keyname is located, the corresponding value submitted by the user is provided to the respective position in the values field array indicated by the respective index, e.g., replaces the previous value as shown in step 590. Alternatively, the corresponding value of the input keyname may be provided to a calling function through a function, for example, int PtEventGetKeyValuePair(PT_EVENT PtEvent, PT_CHAR_T*KeyName, const PT_CHAR_T**KeyValue). This function will get the corresponding value from a respective keyname and provide to the caller the current corresponding value for the input key.

If the input keyname was not found in step 550, the event API sets the index to the next available index in the keys field array and values field array, for example, one greater than the present value of NumKeys. In step 560, the event API provides the input keyname to the keys field array in the position indicated by the index, for example, the value in the field NumKeys. In an exemplary embodiment of the present invention, a key may be set through a function such as int PtEventSetKeyNameByIndex(PT_EVENT PtEvent, int Index, PT_CHAR_T*Key). If the keys field array already contains a key in the position indicated by the index, the input keyname replaces the previously stored key. The event API may also determine whether the respective event, for example, PtEvent and Key are null and Index is less than one. If any of PtEvent and Key are null and Index is less than one, the event API provides an error message and does not set the key.

In step 570, the event API provides the corresponding value of the input keyname to the values field array in the position indicated by the index, for example, the value in the field NumKeys. In an exemplary embodiment of the present invention, the corresponding value of the input keyname may be set through a function such as int PtEventSetKeyvalueByIndex(PT_EVENT PtEvent, int Index, PT CHAR_T*Value). The event API may also determine whether the respective event, for example, PtEvent and value are null and Index is less than 1. If any of PtEvent and value are null and Index is less than 1, the event API may provide an error message and not set the value.

In an exemplary embodiment of the present invention, the function, extern int PtEventSetKeyValuePair (PT_EVENT, PT_CHAR_T *, PT_CHAR_T *), is used to create a new key value pair in the event. For example, if an additional attribute of the event was the name of a file system to which the event pertains, the call PtEventSetKeyValuePair (PtEvent, "FileSystem", "/usr"), for example, would add a key value pair for the file system /usr on a node of the enterprise about which the event is reported. Calling this function again with the same key will result in updating the value.

In an exemplary embodiment of the present invention, a function, extern int PtEventRemoveKeyValuePair (PT_EVENT, PT_CHAR_T *), for example, allows a user to reverse the action of having added a key value pair to an event. The action may be reversed by, for example, locating and removing the key value pair from their respective arrays. Further, all key value pairs higher in the array than the removed pair are shifted back one position, the size of respective arrays are decreased by one, and the index value in the field, for example, NumKeys, is decreased by one. In an exemplary embodiment of the present invention, the function extern int PtEventGetKeys (PT_EVENT, PT_CHAR_T ***, int *), for example,, obtains a list of the additional keys used to extend an event structure for a respective event.

The event management system of the present invention, includes a compatibility mechanism for allowing communication of events within the enterprise with different versions of event structures. Different versions of event structures must not remove predefined fields of an event and if a new field is added to the event structure, the new field must be assigned a default value to be used in the absence of a value. The event management system of the present invention packs a message describing how the event structure is depicted into a self-describing message structure (e.g., the message includes predefined field names which describe what the data in the message following the field name is going to be and version stamps the event structure). Version stamping includes providing a predefined field name of the event structure, version, with a version number of the event structure packed into the message. The message structure of the present invention includes pairs of descriptors of fields (e.g., field names) with the corresponding fields (e.g., contents of the field) allowing the messages to be constant across different versions. The compatibility mechanism of the event structure marshals the message into the message structure, for example, by searching the message for the fields it needs to complete the message structure. The searching may include, for example, ignoring fields that may have been added in later versions of the event structure than a version currently being populated or providing a default value for fields not found, when the version of the event structure being unpacked is less than the current event structure (e.g., when the current event structure could have newer fields). The default could be hard coded or could be determined by an algorithm that examines the contents of other fields in the event. For example, if a new field was just dividing an old field into a plurality of separate fields, an algorithm could be applied to the old fields to come up with suitable values for the new fields.

Not removing predefined fields of an event structure ensures that a new process such as a point product may communicate with older versions of the event management system, other point products or the director. This is particularly important when events are consolidated or cross node boundaries for any other reason such as event correlation rules. If compatibility across versions was not present, an upgrade of the structure would require all processes on all nodes that intercommunicate to simultaneously upgrade. The older process would expect to be able to find all the fields it needs to populate its event structure. Assigning a new field a default in the absence of a value allows a newer version process such as a point product that receives a message from an older process, to populate a later version of an event structure when the field is absent from the incoming message. This value may be assigned, for example, based on the values of other fields.

The embodiments described above are illustrative examples of the present invention and it should not be construed that the present invention is limited to these particular embodiments. Various changes and modifications may be effected by one skilled in the art without departing from the spirit or scope of the invention as defined in the appended claims.

What is claimed is:

1. A method for extending an event structure comprising:
   allowing a user to submit a keyname and a corresponding value for the event structure;
   determining whether the keyname exists in a keys field array of the event structure;
   if the keyname does not exist in the keys field array,
      incrementing an index of the event structure,
      adding the keyname to a position in the keys field array based on the index, and
      adding the corresponding value to a position in a values field array based on the index; and
   if the keyname does exist in the keys field array,
      determining the position of a previously stored value in the values field array associated with the keyname, and
      replacing the previously stored value in the values field array with the corresponding value.

2. The method of claim 1, wherein the incrementing adding, determining, and replacing are performed dynamically.

3. The method of claim 1, wherein the method further includes:
   providing an error message if the keyname and the corresponding value are null.

4. The method of claim 1, wherein the keys field array and the values field array have the same size.

5. The method of claim 1, wherein the keyname and the corresponding value have the same index values in their respective arrays.

6. The method of claim 1, wherein the method further includes providing an error message if the index is less than one.

7. The method of claim 1, wherein if the keyname does exist in the keys field array,
   determining if the user instructed to delete the keyname and the corresponding value, and if the user instructed to delete the keyname and the corresponding value,
      locating an index of the event structure where the keyanme is stored,
      deleting the keyname from a position in the keys field array based on the index, and
      deleting the corresponding value from a position in a values field array based on the index.

8. A program storage device readable by machine, tangibly embodying a program of instructions executable by the machine to perform method steps of extending an event structure, comprising:
   allowing a user to submit a keyname and a corresponding value for the event structure;
   determining whether the keyname exists in a keys field array of the event structure;
   if the keyname does not exist in the keys field array,
      incrementing an index of the event structure,
      adding the keyname to a position in the keys field array based on the index, and
      adding the corresponding value to a position in a values field array based on the index; and
   if the keyname does exist in the keys field array,
      determining the position of a previously stored value in the values field array associated with the keyname, and
      replacing the previously stored value in the values field array with the corresponding value.

9. The program storage device of claim 8, wherein if the keyname does exist in the keys field array,
   determining if the user instructed to delete the keyname and the corresponding value, and if the user instructed to delete the keyname and the corresponding value,
      locating an index of the event structure where the keyanme is stored,
      deleting the keyname from a position in the keys field array based on the index, and
      deleting the corresponding value from a position in a values field array based on the index.

* * * * *

UNITED STATES PATENT AND TRADEMARK OFFICE
CERTIFICATE OF CORRECTION

PATENT NO. : 6,748,454 B1
DATED : June 8, 2004
INVENTOR(S) : William N. Pohlmann, Kenneth D. Matson and David Asbell It is certified that error appears in the above-identified patent and that said Letters Patent is hereby corrected as shown below:

<u>Title page,</u>
Item [22], PCT Filed, "June 18, 2001" should be -- December 31, 1998 --

Signed and Sealed this

Thirty-first Day of May, 2005

JON W. DUDAS
*Director of the United States Patent and Trademark Office*